United States Patent [19]

Leonard

[11] Patent Number: 4,715,953

[45] Date of Patent: Dec. 29, 1987

[54] HOLLOW FIBER SEPARATION DEVICE MANIFOLD

[75] Inventor: Ronald J. Leonard, Harvard, Ill.

[73] Assignee: Baxter Travenol Laboratories, Inc., Deerfield, Ill.

[21] Appl. No.: 481,439

[22] Filed: Apr. 1, 1983

[51] Int. Cl.[4] ............................................. B01D 13/00
[52] U.S. Cl. .............................. 210/321.8; 210/497.1; 422/48
[58] Field of Search ............ 422/48; 210/497.1, 321.1, 210/321.2, 321.3

[56] References Cited

U.S. PATENT DOCUMENTS

| 3,198,335 | 8/1965 | Lewis et al. | |
|---|---|---|---|
| 3,455,460 | 7/1969 | Mahon et al. | |
| 3,794,468 | 2/1974 | Leonard | 422/48 |
| 4,306,018 | 12/1981 | Kirkpatrick | |

FOREIGN PATENT DOCUMENTS 2041821A 9/1980 United Kingdom .

*Primary Examiner*—Frank Spear
*Attorney, Agent, or Firm*—Mary Jankousky; Paul C. Flattery; Garrettson Ellis

[57] ABSTRACT

A hollow fiber separation device such as an oxygenator for blood which comprises a core having a bundle of hollow tubular fibers circumferentially wrapped around the core for separation of materials. A housing encloses the bundle and first and second manifold systems respectively provide separated flow through the bundle in contact with exterior surfaces of the hollow fibers and the bores of the hollow fibers in first and second flow paths. A space extends longitudinally through the bundle exposing open ends of the fibers at opposed sides of the space, regions of the bundle are adjacent to the space being potted to prevent leakage around to the fibers. The second manifold system includes an inlet and outlet conduit, each being in flow communication with the space. Partition means in the space isolates fluid flow between the inlet conduit in one of the opposed sides from fluid flow between the outlet conduit in the other of opposed sides.

11 Claims, 4 Drawing Figures

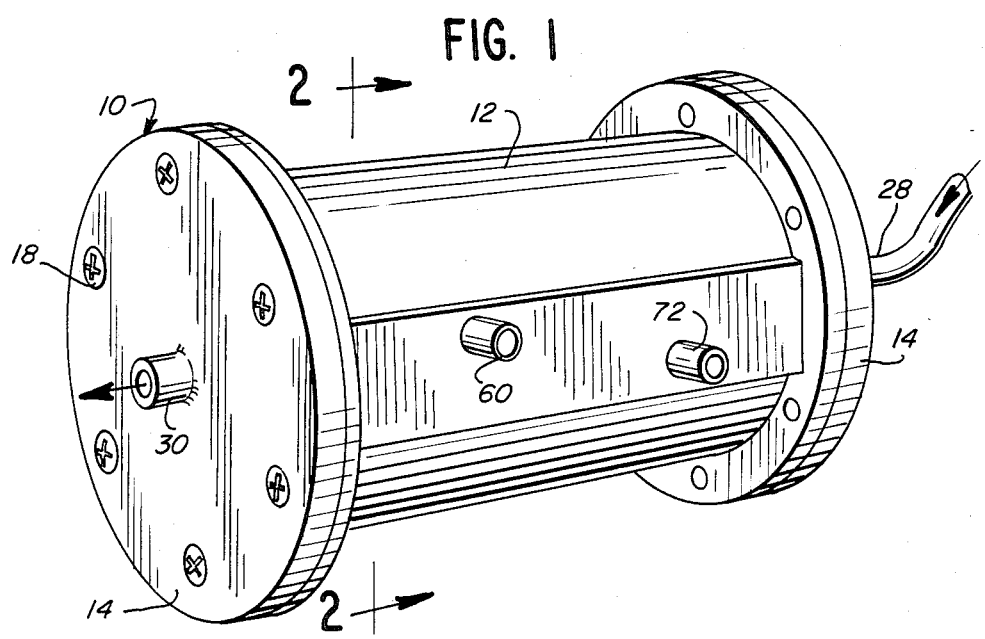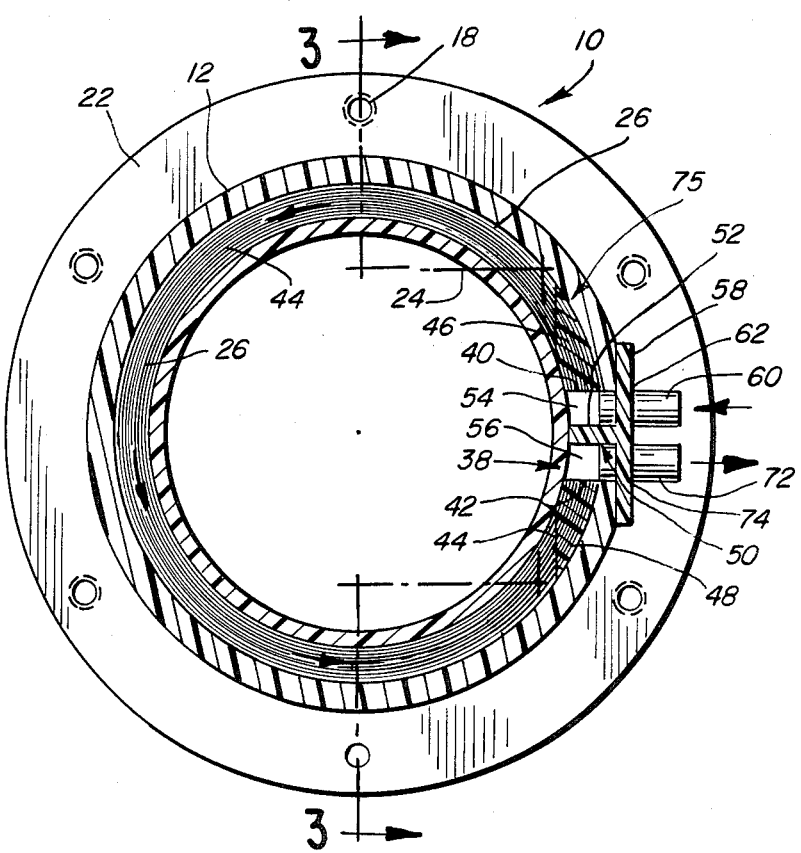

HOLLOW FIBER SEPARATION DEVICE MANIFOLD

TECHNICAL FIELD

This application relates to a hollow fiber separation device in which one or more bundles of hollow fibers are circumferentially wrapped about a core which is typically cylindrical and hollow. A novel manifold system is provided.

Hollow fiber separation devices include dialyzers in which the hollow fiber is made of a cellulose based material, many commercial designs of such hollow fiber dialyzers being currently available on a commercial basis.

In Hasegawa et al., U.S. Pat. No. 4,239,729 a hollow fiber oxygenator for blood is disclosed in which the hollow fibers are made of porous polyolefin resin and extend from end to end of the housing in a configuration roughly similar to the typical design of commercial hollow fiber dialyzers. In such a design, the blood flow in the bore of such a hollow fiber develops an undesirable "parabolic" velocity profile i.e., with a faster flow rushing through the center of the fiber bore, spaced from the wall thereof, while the blood flow adjacent the wall is slower, with poor mixing. A similar design of hollow fiber gas transfer device is disclosed in Shindo et al. U.S. Pat. No. 4,268,279.

Because of the poor mixing, such devices are relatively inefficient, requiring large surface areas of the hollow fiber to achieve the desired gas transfer results. Such a device may require almost 6 square meters of hollow fiber membrane area to provide results comparable to conventional folded membrane oxygenators, for blood, for example the TMO ® Blood Oxygenator sold by Travenol Laboratories, Inc. of Deerfield, Ill., having a membrane surface area of about 2 square meters, or the LPM-50 TM membrane oxygenator, also sold by Travenol and having a membrane surface area of 3 square meters.

Furthermore, the unduly large membrane area required in prior art hollow fiber oxygenators for blood results in a higher volume of blood necessary to prime the device for use. It is, of course, desirable to keep the priming volume of blood in any extracorporeal device to an absolute minimum. Similarly, it is desired to keep membrane surface area to a minimum, to minimize the foreign surface contact to the blood and also, of course, to minimize the cost of the device.

Several devices have been described which attempt to improve blood mixing in oxygenation. See, for example, U.K. Pat. application No. 2,047,874A and U.S. Pat. No. 3,794,468.

Also, in the field of dialyzer technology it is known to wind hollow fibers with multiple windings on a spool or other core, as in McLain et al., U.S. Pat. No. 3,422,008.

In Mahon et al. U.S. Pat. No. 3,455,460 a permeability separatory apparatus is suggested in which access to a bundle of hollow fibers wound on a core is provided through a longitudinal slot. However, the system is unsuitable for use as a blood oxygenator, lacking a dynamic controlled flow path through the bores of the hollow fibers since both ends of the hollow fibers merely communicate with the same collecting chamber.

In accordance with this invention, a hollow fiber separation device, and paticularly an oxygenator for blood, is provided having a novel manifold system which permits the blood, for example, to pass outside the hollow fibers for nonlaminar flow with good mixing. The result of this is to provide greater efficiency of oxygenation or other blood processing functions, so that less membrane surface area, and specifically fewer fibers, are required to perform the operation. Oxygen gas or other fluid can pass with positive flow control through the interior of fhe hollow fibers by the novel manifolding system of this invention, with particularly short flow paths through a large amount of fibers being provided for diffusion exchange with blood or other fluids in the space outside of the fibers.

DESCRIPTION OF THE INVENTION

In accordance with this invention a hollow fiber separation device is provided which comprises a core, a bundle of hollow, tubular fibers for separation of materials, with the fibers being circumferentially wrapped about the core, and a housing enclosing the bundle.

A first manifold system is provided for permitting fluid flow through the bundle in a first flow path in contact with the exterior surfaces of the hollow fibers. A second manifold system is provided for permitting fluid flow through the bores of the hollow fibers in a second flow path which is separated from the first flow path.

A space, typically cut through the bundle of hollow fibers wound around the core, extends longitudinally through the circumferentially wrapped bundle, exposing open ends of the hollow fibers at opposed sides of the space. The term "longitudinally" is intended to indicate longitudinal relationship to the axis of the typically cylindrical core, so that the resulting shape of the bundle of hollow fibers wrapped about the core typically assumes a configuration of a split ring.

Regions of the bundle adjacent to the space are potted in a manner similar to the conventional potting of hollow fiber diffusion devices with a polyurethane potting compound or the like, to prevent leakage around the fibers.

In accordance with this invention, a second manifold system is provided including an inlet conduit and an outlet conduit, each being in flow communication with the space. Partition means are also provided in the space, to isolate fluid flow between the inlet conduit and one of the opposed sides having exposed fiber open ends from fluid flow between the outlet conduit and the other opposed side.

Accordingly, referring to the precise pattern of the second flow path, fluid (typically oxygen gas) passes through the inlet conduit into the space, where it enters the ends of the bores of the hollow fibers defined in the one opposed side that is in communication with the inlet conduit. The other opposed side is blocked from such communication by the partition means. The fluid then passes through the bores in a typically helical path about the core, until the same hollow fibers end at the other of the opposed sides. The fluid flows out of the bores at that point back into the space on the other side of the partition means, from where it can flow into the outlet conduit for removal from the system. This happens because the fibers are circumferentially wrapped about the core at an angle to its axis, and particularly in a helical pattern so that the cut space intersects each of the ends of the individual fibers in the bundle, each individual fiber after cutting the space typically defining a single loop about the core of less than 360 degrees, beginning at one of the opposed sides of the space and ending at the other of the opposed sides, being retained in position by the regions of cured potting compound provided to prevent leakage around the fibers and to retain them.

The housing surrounding the bundle of wrapped fibers may define annular recesses to receive annular end enlargements of the bundle formed as a consequence of the winding process.

The separation device of this invention may be used as a dialyzer for blood or other material, as an oxygenator as stated above, a reverse osmosis device, a membrane plasmapheresis device, a filter, or for any other type of treatment of blood or any other desired material.

For the manufacture of the device of this invention, a bundle of hollow tubular fibers for separation of materials is circumferentially wrapped about the core in at least one and optionally many loops. A longitudinally extending band of potting compound is applied to a portion of the bundle wrapped around the core, optionally with centrifigation within a retaining sleeve to cause the potting compound to be in intimate, permeating relationship of a longitudinal segment of the bundle (the bundle being typically cylindrical in shape) until the potting compound is cured. Thereafter, the longitudinally extending space is formed by cutting away from the potted bundle an area spaced from the edges of the potted section, to define the space and the open ends of the fibers at opposed sides of the space, having potted regions of the bundle on each side of the space. Accordingly, what is provided is a space which extends longitudinally, typically the entire length of the core, intersecting and cutting the length of fibers to provide a large number of single loops of hollow fiber, with the single loops of hollow fiber being retained at their beginnings and ends by the remaining sections of potted fiber mass on both sides of the space.

Thereafter, the partition means may by applied, along with the inlet and outlet conduits, which may be retained in the partition means. The housing is placed around the bundle, and the partition means may be sealed or otherwise attached to the housing for stablization.

The first manifold system may cause blood or other fluid to flow longitudinally through the bundle surrounding the core. The first manifold system may be of a design analogous to designs shown in the previously cited U.S. Pat. No. 3,794,468, or specifically of the design shown below.

DESCRIPTION OF THE DRAWINGS

FIG. 1 is a perspective view of an oxygenator made in accordance with this invention.

FIG. 2 is a transverse sectional view of the oxygenator of FIG. 1.

DESCRIPTION OF SPECIFIC EMBODIMENT

Figure 3:
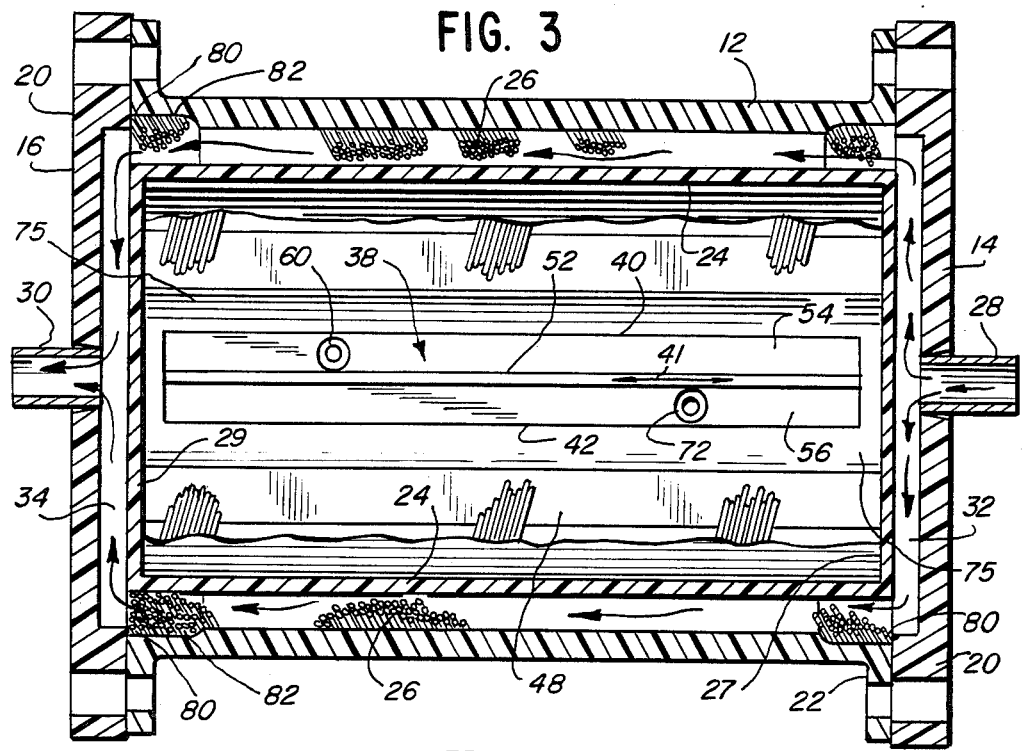
FIG. 3 is a longitudinal sectional view of the oxygenator, taken along line 3—3 of FIG. 2.
Figure 4:
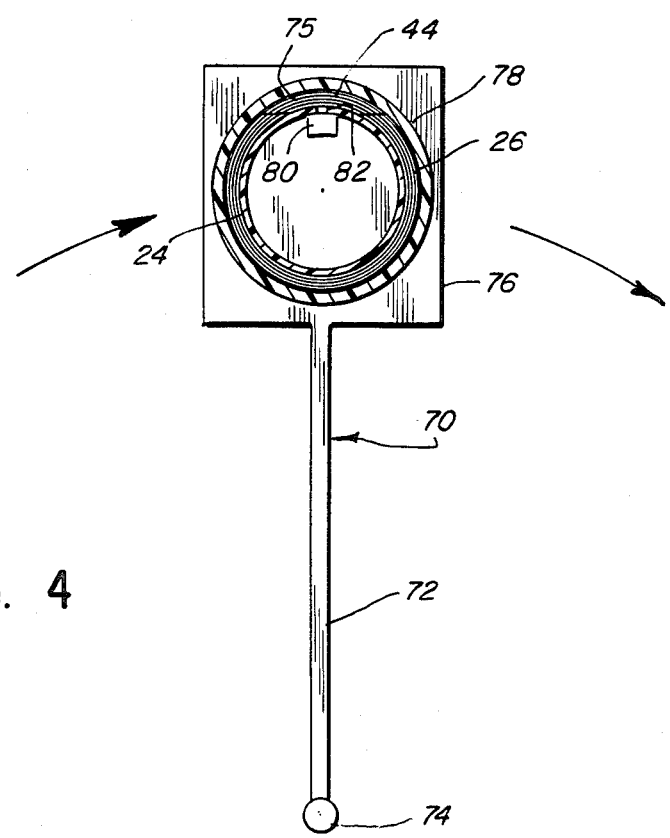
FIG. 4 is a schematic view of the oxygenator during the manufacturing step of curing the band of potting compound while centrifuging.

Referring to the drawings, hollow fiber oxygenator 10 includes housing 12 having ends sealed with end caps 14, 16, which may be held together by bolts or rivets 18 between respective flanges 20, 22 of the various parts. The bundle 26 of hollow fibers is shown wrapped around cylindrical, hollow core 24, with the individual windings of fibers being initially wrapped around core 24 in a helical array extending at least one loop about the core (and preferably ten or more) as it extends along its length, so that a beginning and end of each cut fiber can face the space described previously for feed and expulsion of fluid to and from the bores of the fibers.

As shown, core 24 carries end walls 27, 29 so that core 24, casing 12, and end plates 14, 16 collectively define part of a first blood flow path. Entry port 28 and exit port 30 are provided so that blood can flow into the typically circular space 32 between end cap 14 and end wall 27 of the core, flowing to the periphery of circular space 32 into contact with bundle 26 of the hollow fibers which surrounds core 24, and percolating between the helically arranged hollow fibers in diffusion exchange relationship therewith. Thereafter, the blood is collected in circular manifold chamber 34 defined between end wall 29 of the core and end wall 16, which is carried by the casing, to move radially inwardly and out exit port 30. Accordingly, the blood flows through the bundle in an almost cylindrical path except for the longitudinally extending space and potted areas previously described.

Longitudinally extending space 38 is provided, space 38 extending in the direction typically parallel to the axis 41 of core 24 and typically extending substantially the entire length of core 24.

On opposed sides 40, 42 of space 38, open ends of hollow fibers 44 of bundle 26 are exposed to space 38. Also, regions 46, 48 of bundle 26 which are adjacent to space 38 are potted with a urethane potting compound or like in a manner analogous to the potting technology used in hollow fiber dialyzer production to hold the hollow fibers in position and to prevent leakage. Thus only the bores of the hollow fibers 44 communicate with space 38. Fluid in space 38 cannot percolate between the hollow fibers in bundle 26, being blocked by the potting compound 75 in regions 46, 48 and the sealing of core 24 and housing 12.

As shown, partition means 50 is disclosed, defining first wall 52 which occupies space 38 and divides it into two substantially sealed sections 54, 56. Second wall 58 is carried transversely on first wall 52 and, in turn, can be solvent sealed to housing 12 for retention thereof, and also to seal space 38 from the exterior.

Inlet conduit 60 can pass through an aperture 62 in second wall 58 to terminate in communicating relationship with section 54 of space 38. Thus, fluid flowing through inlet conduit 60 communicates with opposed side 40 facing space 38 in which the open bores of the individual hollow fibers 44 are defined. Thus the fluid can pass through the hollow fibers in bundle 26 in a multitude of helical paths around core 24 to the other ends of fibers 44, which are found at opposed side 42 facing section 56 of space 38. There, they may communicate with an open end of outlet conduit 72 which extends through aperture 74 of second wall 58.

Accordingly, the fluid flowing in the second flow path defined between inlet conduit 60 and outlet conduit 72 may be oxygen flowing in a helical pattern through the bores of the hollow fibers 26 about core 24, while being in cross-flow communication with flowing blood which percolates between inlet 28 and outlet 30 through bundle 26 along the exterior surfaces of the helically arranged hollow fibers. The multiple, short flow paths of the oxygen provide abundant fresh oxygen for the system, while the flow path of the blood eliminates laminar flow and provides good mixing for improved oxygenation efficiency.

It can be seen in FIG. 3 that space 38 may be enclosed by the mass of potting compound 75. Potting compound may be longer than space 38, with the end sections of the mass of potting compound 75 serving as an added seal.

The apparatus of this invention may be manufactured by winding microporous polypropylene hollow fiber, as an oxygenation membrane, for example, on core 24 like thread onto a spool or fishing line onto a fishing reel. The angle of the fiber, with respect to the core, is preferably about 75–89 degrees, typically about 80 degrees, with the winding proceeding with known winding apparatus, laying down layer after layer of helically wound microporous hollow fiber on core 24. Each individual layer of wound fibers in this configuration assumes a substantially equal and opposite angle to the layer immediately below it and above it, and all of the length of hollow fiber exhibits a relatively large acute angle to axis 41 of core 24, and also to the general direction of flow of blood through the bundle 26 of hollow fibers thus formed for good mixing of the blood while passing through.

The particular polypropylene fibers used may preferably have an outer diameter of 100–400 microns, a wall thickness of 25–30 microns, and pores of 0.01–0.5 microns effective diameter with an overall porosity of the fiber of 15–35 percent typically about 25 percent. The actual winding of bundle 26 may be performed so that the ratio of void volume to volume occupied by polypropylene material in the bundle of fibers (i.e. the void fraction) is preferably about 0.5–0.7, preferably about 0.6. Diffusion exchange performance goes up but so also does the pressure drop as the void fraction is reduced by tighter and closer winding, so it is desired to provide a balance to optimize the combined factors of performance and pressure drop with a void fraction on the order of 0.6.

The diameter of the core is preferably 3 inches or greater, specifically about 3.5 inches, while the radial thickness of bundle 26 is preferably about a quarter inch. It is particularly preferred for the ratio of the thickness of bundle 26 to the diameter of core 24 to be no more than 1 to 12, to avoid significant differences in the pattern of fiber lay down, due to a significantly varying radius of curvature the radially inner portion of the bundle when compared with the radially outer portion of the bundle.

After winding of bundle 26, it may be placed in a centrifuge 70 having a rotating arm 72 which rotates about center of rotation 74 and defines chamber 76 in which the semi-finished structure of this invention is placed. Bundle 26 may be wrapped with an outer casing or wrapping 78, and potting compound 75 may be inserted into a longitudinally extending section of bundle 26. This may be accomplished, for example, by the presence of a chamber 80 on the inside of core 24 which is initially filled with potting compound and communicated through a series of ports 82 through core 24 into flow communication with bundle 26. Accordingly, centrifuge 70 is activated, with arm 72 being desirably relatively long with respect to the diameter of core 24 (preferably about 3 or more times the length thereof) with chamber 80 being oriented in a radially outwardmost position upon centrifugation. Potting compound flows from chamber 80 through ports 82 distributed along the length of chamber 80, which may be of a substantially similar length to the desired potted section 75, and potting compound flows from chamber 80 into the radially outward longitudinal section of bundle 26 due to the centrifugal action, being held there as shown until cure has taken place.

Thereafter, the cured, potted segments of bundles 26 may have longitudinally extending space 38 cut therein, with partition means 50 and the related structure being added, after removal of outer wrap 78, if desired, and replacement with housing 12.

Because when bundle 26 is wound on core 24 by a rotary threading means in the manner of a fishing line onto a reel, or a thread onto a spool, there is an enlargement 80 of fiber material at the ends thereof (see FIG. 3) housing 82 may have corresponding annular recesses 82 formed to snugly receive the end enlargements 80 in the wound bundle 26.

Thus an improved hollow fiber separation device is provided which is especially useful as an oxygenator for blood.

The above has been offered for illustrative purposes only, and is not intended to limit the scope of this invention, which is as defined in the claims below.

That which is claimed:

1. In a hollow fiber separation device which comprises a core, a bundle of hollow tubular fibers for separation of materials, said fibers being circumferentially wrapped about the longitudinal axis of said core, a housing enclosing said bundle, a first manifold system for permitting fluid flow through said bundle in a first flow path in contact with the exterior surfaces of said hollow fibers, and a second manifold system for permitting fluid flow through the bores of said hollow fibers in a second flow path separated from the first flow path, said second manifold system including a space extending longitudinally through said circumferentially wrapped bundle exposing open ends of said fibers at opposed sides of said space, regions of said bundle adjacent to said space being potted to prevent leakage around said fibers, the improvement comprising, in combination:

said second manifold system including an inlet conduit and an outlet conduit, each being in flow communication with said space, and partition means in said space to isolate fluid flow between the inlet conduit and one of said opposed sides from fluid flow between the outlet conduit and the other of said opposed sides.

2. The separation device of claim 1 in which said hollow tubular fibers are circumferentially wrapped about said core in an essentially helical array.

3. The separation device of claim 1 which is an oxygenator for blood, the blood flow path being the first flow path.

4. The separation device of claim 1 in which said partition means comprises a first wall extending between said inlet and outlet conduits and a second wall, carried transversely on said first wall, said second wall being affixed to said housing.

5. The separation device of claim 4 in which said second wall defines aperture means through which said inlet and outlet conduits extend.

6. In a hollow fiber oxygenator which comprises a core, a bundle of hollow tubular fibers for separation of materials, said fibers being circumferentially wrapped about the longitudinal axis of said core in an essentially helical array, a housing enclosing said bundle, a first manifold system for permitting fluid flow through said bundle in a first flow path in contact with the exterior surfaces of said hollow fibers, and a second manifold system for permitting fluid flow through the bores of said hollow fibers in a second flow path separated from the first flow path, said second manifold system including a space extending longitudinally through said circumferentially wrapped bundle exposing open ends of said fibers at opposed sides of said space, regions of said bundle adjacent to said space being potted to prevent leakage around said fibers, the improvement comprising, in combination:

said second manifold system including an inlet conduit and an outlet conduit, each being in flow communication with said space, and partition means in said space between said inlet and outlet conduits to isolate fluid flow between the inlet conduit and one of said opposed sides from fluid flow between the outlet conduit and the other of said opposed sides, and annular recesses defined in said housing to snugly receive annular end enlargements of said bundle.

7. The separation device of claim 6 in which said partition means comprises a first wall and a second wall, carried transversely on said first wall, said second wall being affixed to said housing.

8. The separation device of claim 7 in which said second wall defines aperture means through which said inlet and outlet conduits extend.

9. The method of forming a manifold in a hollow fiber separation device which comprises a core, a bundle of hollow tubular fibers circumferentially wrapped about the longitudinal axis of said core with each individual fiber being wrapped about said core with at least 10 windings which comprises: applying a longitudinally extending band of potting compound to a portion of the wrapped bundle to cause said potting compound to an intimate, permeating relationship of a longitudinal segment of said bundle; allowing said potting compound to cure; centrifuging said bundle and core while said potting compound is cured, for retention of said potting compound in its longitudinal segment; thereafter cutting a longitudinally extending space into the potted band at an area spaced from the edges of said longitudinally extending band of potting compound, to define a pair of opposed walls of said potted bundle facing said space with the fibers having open ends extending through said opposed wall; and thereafter applying a partition means to said space to divide said space into a pair of sections sealed from each other by the partition means, and applying an inlet conduit to one of said sections and an outlet conduit to the other of said section, whereby fluid flow may pass from the inlet conduit in one of said sections, through the hollow fibers, to the other of said sections and the outlet conduit in sealed manner.

10. The method of claim 9 in which the centrifuge radius is at least 3 times the diameter of said core.

11. The method of claim 10 in which said core and potted bundle are thereafter placed in a housing.

* * * * *